Figure 1:
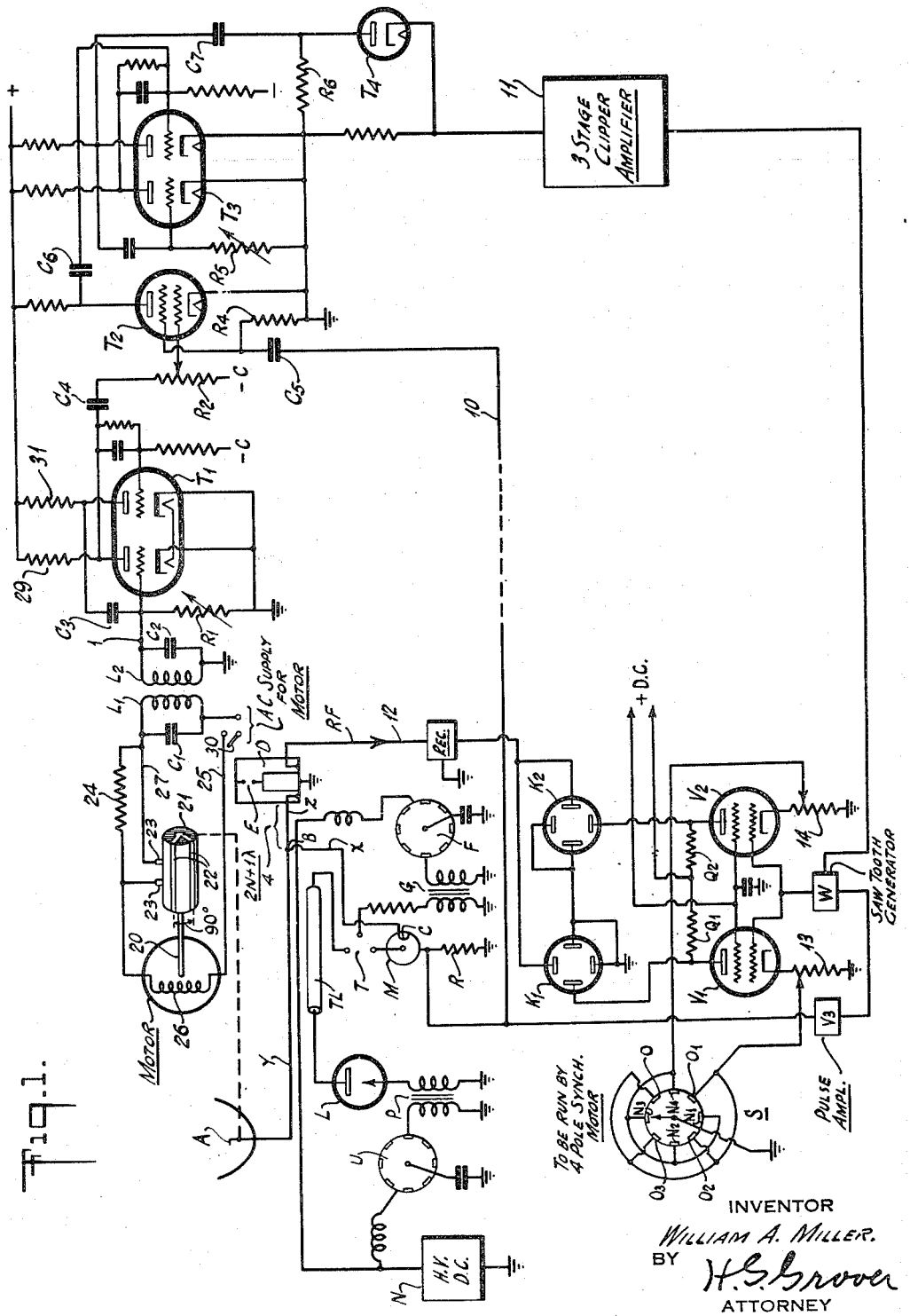

Nov. 15, 1949
W. A. MILLER
2,488,136
ELECTRONIC INDICATOR SYSTEM
Filed June 30, 1944
2 Sheets—Sheet 2
Fig.2.
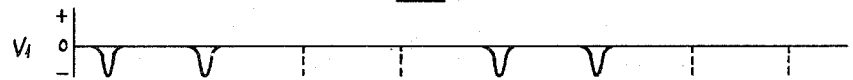
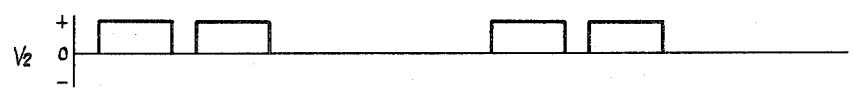
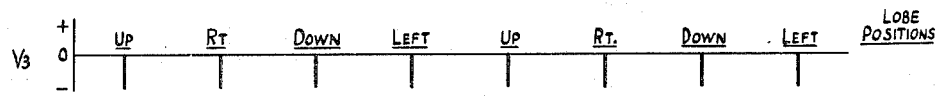
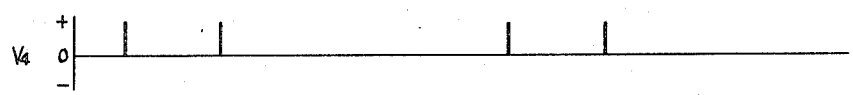
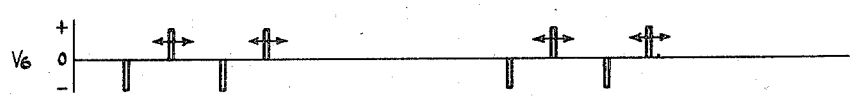
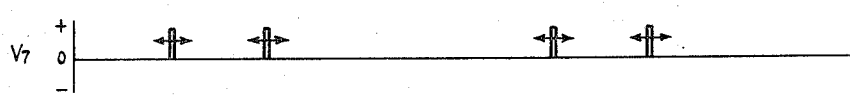
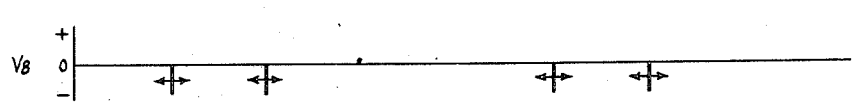
INVENTOR
WILLIAM A. MILLER.
BY H.S. Grover
ATTORNEY Patented Nov. 15, 1949

2,488,136

UNITED STATES PATENT OFFICE 2,488,136

ELECTRONIC INDICATOR SYSTEM

William A. Miller, Port Jefferson, N. Y., assignor to Radio Corporation of America, a corporation of Delaware Application June 30, 1944, Serial No. 542,991

7 Claims. (Cl. 343—11)

1

This invention relates, in general, to improvements in the method of and apparatus for indicating on an oscilloscope a particular beam position of an antenna which assumes a plurality of different positions periodically.

In obstacle detection systems, sometimes known as radio locators, it has been proposed to cause a small deflection of a radio beam at regular intervals through the four quadrants of a circle which is perpendicularly located to the mean axis of the beam, and to transmit a pulse during each quadrant. This can be done either by wiggling the whole antenna system, or (for example, in the case of an antenna utilizing a parabolic reflector with a radiating element positioned slightly off-center, eccentrically, so to speak) by spinning the radiating element in a circle, or by spinning a deflecting element off the focus of the reflector. Such an antenna system, when employed for radio locating purposes, must not only be able to produce the beam deflections at regular intervals, but must be freely movable in all directions for scanning purposes and for pointing the antenna directly on the object to be detected. A suitable antenna of the foregoing type has been designed by Philip S. Carter and described in copending application Serial No. 462,251, filed October 16, 1942.

Reference is made to my copending application Serial No. 473,801, filed January 28, 1943, now U. S. Patent No. 2,422,361, granted June 17, 1947, and the copending application of Nils E. Lindenblad, Serial No. 454,661, filed August 13, 1942, for a detailed description of the general type of object detection system to which the present invention is applicable.

The object detection or radio locating system of the foregoing copending applications, and also the present invention is generally of the type described in Lindenblad copending application Serial No. 441,311, filed May 1, 1942, now U. S. Patent No. 2,411,140 granted Nov. 12, 1946 which employs a transmitter for transmitting periodically repeated radio wave pulses of extremely short duration. A receiver is used to receive the pulses which are reflected by the object to be detected. This system employs a directive antenna and other expedients at both transmitter and receiver by means of which the indications are confined to objects or targets lying within a narrow range of angles. In order to produce the radio wave pulses, the oscillator of the transmitter is excited periodically through a spark gap switching device which is in series with the

2 oscillator and the charging voltage source and to which is supplied at periodic intervals a voltage of sufficient value to break down the gap. The copending application of Clarence W. Hansell, Serial No. 427,266, filed January 19, 1942, which issued as Patent No. 2,455,673, December 7, 1948, also describes, generally, the principles of the radio locating system to which the present invention can be applied.

The transmitting antenna of the pulse type radio locating systems described above preferably comprise a parabolic antenna having, off-center, an eccentrically positioned radiating element which is rotated by a two-pole synchronous motor at about sixty times per second. The entire system is designed to radiate a pulse of ultra high frequency energy in each of the four quadrants of the circle traveled by the radiating element in each revolution. At a speed of rotation of sixty times per second, the pulses will be radiated 240 times per second, corresponding to a pulse for each quadrant position of each revolution of the antenna. The up and down beam firing positions of the radiating element determine the vertical position of the object to be detected, while the right and left beam firing positions of the radiating element determine the horizontal positions. The radiation patterns or ears of the beam will, of course, be different for different quadrants of the circle as the radiating element rotates. The antenna system is so designed that the ears of the radiation patterns overlap in the up and down beam firing positions and also overlap in the right and left beam firing positions. Since the time interval between radiated pulses is quite long compared to the time of each pulse, it will be understood that a pulse reflected by a remote object or target to be detected will be received at the receiver located adjacent the transmitter during the same quadrant of rotation in which the original pulse is radiated. As an illustration, the pulse radiated during each quadrant position of each revolution of the antenna may have a duration of only one microsecond or so.

If the pulses which are reflected from a remote object were originally radiated in the up and down positions of the rotating radiating element, they will be received during the same up and down positions, and if these received pulses are of equal intensity, it follows that the horizontal plane of the antenna system is pointed at the object. If the reflected pulses received during the right and left positions of the rotating radiating element are also of equal intensity, it follows that the vertical plane of the antenna system is also pointed at the object. Under these conditions, the object to be detected is in a direct line with the focus of the antenna. If now, the parabolic reflector of the antenna is made of widely spaced wires in mesh formation, and the object is within visual distance, the illumination by a searchlight placed behind the reflector will illuminate the object.

If the received pulses reflected from the object are of unequal intensity, it is an indication that the antenna system is not pointed directly at the object, but to one side of the object.

The reflected pulses which are received are viewed on a pair of cathode ray oscilloscopes, one of which indicates the pulses received during the up and down positions of the rotating radiating element, and the other of which indicates the pulses received during the right and left positions of the rotating radiating element.

Inasmuch as a two pole synchronous motor is employed to rotate the antenna system, and since this motor can start either in the up or down position of the radiating element, it is important to provide a determination of whether the first reflected pulse received back from the object to be detected corresponds to either the up or down position.

One difficulty with the systems of the copending applications hereinabove referred to lies in the possibility of confusion to the operator when there are a plurality of closely located objects which are being observed simultaneously. In such events, the echoes from all of these objects are displaced on the oscilloscope screen in an attempt to distinguish between the up and down antenna lobe positions and between the right and left antenna lobe positions. If two objects being simultaneously observed on the oscilloscope are close to each other, the displaced echo pulse from one object may appear on the oscilloscope screen on the other side of the non-displaced echo pulse of the other object. The operator will then have considerable difficulty in determining which of the many split pulses on the oscilloscope screen emanate from the same object.

This difficulty is overcome in the present invention which enables the operator to displace the echo pulse from any selected one of a number of objects or targets whose reflected pulses appear on the screen. In this way, the operator can concentrate on one object or target to the exclusion of the other targets.

In practice, the sweep trace on the oscilloscope screen does not appear as a single straight line, but contains a number of random jagged edges due to the noise generated in the receiving equipment. Heretofore, this noise has appeared over the entire length of the sweep trace, and has been doubled in number over the entire length of the sweep trace due to the echo displacement action which distinguishes the different antenna lobe positions from one another. By means of the present invention, however, the noise is not doubled over the entire length of the sweep trace but only at the position of the echo pulses corresponding to the selected target. Thus, possible confusion to the operator is further minimized.

A more detailed description of the invention follows in conjunction with a drawing, wherein:

Fig. 1 illustrates an embodiment of an object or radio locating system provided with the preferred apparatus of the invention for distinguishing the antenna lobe positions from each other; and Fig. 2 is a series of graphs given as an aid in explaining the operation of the system of Fig. 1.

Referring to Fig. 1 in more detail, there is shown a pulse transmitter comprising an ultra high frequency oscillator M (here shown by way of example as a magnetron) capable of producing oscillations of about ten centimeters wavelength. This oscillator is periodically charged with a high polarizing potential through a spark gap T (air blast type) in circuit with a line TL. The end of line TL which is furthest removed from the spark gap T is connected through a rectifier L to the secondary winding of an induction coil P whose primary winding is connected to a main charging system comprising a source of direct current N and a switching device U. This part of the system serves to convert a relatively low voltage direct current charging potential from N to periodic high voltage pulses for charging the line TL, and corresponds to Fig. 4 of Nils E. Lindenblad U. S. Patent 2,411,140 supra, to which reference is made for a more detailed description of how to produce extremely short pulses of short wave carrier energy. Reference is here made to Nils E. Lindenblad United States Patent 2,275,635, showing pulse charging circuits of interest in this connection.

A trigger spark system comprising an induction coil G, an auxiliary spark gap electrode associated with spark gap T, and a switching device F insures sparking at gap T only when line TL is fully charged and between charging pulses supplied to line TL by system U. That is, the trigger spark system insures the discharge of line TL across gap T and into the magnetron M between the times that the rectifier L is passing charging pulses to the line TL. The trigger spark switch device F is like the switching device U in that when one brush is connected to a segment on the commutator, the other brush of the same switching device is on an insulating segment or portion of the same commutator, and vice versa.

The directive antenna for radiating the extremely short pulses of ultra short wave carrier energy comprises a rotatable radiating element A positioned off the center of a parabolic reflector. This radiating element is driven by a two-pole synchronous motor appropriately labeled, at a speed of 3,600 revolutions per minute, corresponding to sixty revolutions per second. This motor is located quite close to the antenna. The system is so designed that during each quadrant of the circle of each revolution of the radiating element the magnetron will deliver a pulse to the antenna over connections X and Y, as a result of which there will be 240 pulses radiated per second. Each pulse may be of the order of one microsecond duration, or so.

The receiver REC which receives the pulse reflected from the object to be detected, is connected to the radiating element of antenna system A through a TR box system involving lead 12, concentric line resonator D and line Z. Line Z is an odd multiple of a quarter wave long for energy of the carrier frequency generated by magnetron M.

Lead X is coupled to the magnetron oscillator at C by means of a small loop, and is connected to the junction point B of leads Y and Z. This lead is an odd multiple of a quarter wave and is matched from an impedance standpoint to lead Y extending to the antenna, for pulses outgoing from the magnetron.

When short wave carrier pulses are sent out by the magnetron over lead X, the resonator D is energized through lead Z and this causes the spark gap E in the interior of the resonator to break down, thus producing a detuning action in D, as a result of which lead Z becomes a high impedance when looked at from point B. Thus, the main portion of the energy obtained from the magnetron M travels out to the antenna to be radiated thereby, and only a small portion of the energy derived from the oscillator passes over lead Z to maintain the spark across the gap E in resonator D.

As for energy received by the antenna A, the lead X is not matched at point C since it is closed at this point. Because the lead X has an electrical length equal to an odd multiple of a quarter wave long, the impedance of lead X at point B as seen from the antenna is high. However, energy received on the antenna will energize resonator D without producing sparking at E, as a result of which the radio frequency energy in resonator D will pass to the receiver REC for subsequent utilization by the oscilloscopes K1 and K2. The reason why the incoming or received energy will not cause the spark gap E in the resonator to break down while the outgoing energy from the magnetron M will cause a breakdown of the gap E, is because the latter energy is far more intense than the former.

When the magnetron is caused to oscillate by virtue of the surge of current through the spark gap T, the current through the magnetron will pass through a small resistor R or reactance as a result of which a pulse is initiated which is passed through pulse amplifier V3, whose output causes the saw-tooth generator W to start. This saw-tooth generator works on the first grids of vacuum tubes V1 and V2, thus controlling the current through the tubes. The time constants of the saw-tooth generator are adjusted for the maximum distance range to be observed, by making the time of sweep of the generator correspond to the particular distance to be checked. As an example, the particular maximum distance of the radio locating system to be observed may be twelve miles if the rotating antenna system is to be used in connection with a searchlight. On the other hand, the range of distances may be sixty miles, more or less, as desired, with the rotating antenna described above.

Vacuum tubes V1 and V2 are normally non-conducting on account of the cathode bias produced by resistors 13 and 14, respectively, and will pass current when the cathode bias is reduced. The reduction in cathode bias to render the tubes V1 and V2 conductive is obtained by means of switch S. The contact arm of switch S is connected to ground and rotates to cause engagement with segments N1, N2, N3 and N4 and O1, O2, O3 and O. Segments N1 to N4, inclusive, are connected together and to a point on cathode bias resistor 14. Segments O1 to O, inclusive, are also connected together and to a point on cathode bias resistor 13. It should be noted that the segments labeled N1, N2, N3 and N4 alternate with the segments labeled O1, O2, O3 and O. The rotating switch or scope selector S may be driven by a synchronous motor having any number of poles. If, as shown in the drawing, a four-pole machine is chosen, the number of segments on the selector commutator will be eight. Alternate contacts or segments of the selector S are connected together, and each such group of four contacts control the "on" and "off" condition for the saw-tooth sweep of each of the two cathode ray oscilloscopes K1 and K2. Oscilloscope K1 will give a horizontal sweep, while oscilloscope K2 will give a vertical sweep in the particular arrangement illustrated, although both oscilloscopes may be oriented similarly, if desired.

When vacuum tubes V1 or V2 pass current, the voltage drop in resistors Q1 or Q2, respectively, will control certain sweep or deflection plates of the oscilloscopes K1 or K2, as shown.

So far, the system described above is identical with that described in my copending application Serial No. 473,801, now Patent No. 2,422,361, and in Lindenblad copending application Serial No. 454,661, supra. Whereas, in the systems of the above mentioned copending applications, the splitting of the reflected or echo pulses is achieved by displacing the point of origin of the sweep trace, in the present invention the point of origin of the sweep trace is the same for both of the quadrant or lobe positions to be distinguished. However, the present invention employs a displacing pulse during one of the sweeps at a time under the control of the operator so that he may select any echo pulse to be observed representative of any one target in the area being scanned. This displacing pulse causes a momentary increase in the velocity of one sweep at the time selected by the operator. In this way the right and left lobe positions are distinguished from each other, and the up and down lobe positions also distinguished from each other.

Since a two-pole synchronous motor is used to drive the antenna, precautions are employed to insure the fact that the lobe positions are always determinable regardless of the two positions in which the motor may start.

In the system of the present invention, the synchronous motor carries on its shaft 20 an insulating drum 21. This insulation drum is slotted at two places at which are provided metallic segments 22. The radial lines through the centers of the two segments 22 are spaced 90° apart. Two brushes 23 ride on the periphery of insulation drum 21. These brushes are mounted side by side so that both brushes pass simultaneously over each metallic segment 22. Brushes 23 are arranged so that except when they are on the insulation drum, the resistor 24 is short circuited. An indicator may be used in place of resistor 24 to reduce the ohmic loss in the motor circuit if such economy is desired.

The motor is supplied with alternating current 60 cycle power over an obvious circuit which extends from one side of the power supply through a switch 30, lead 25, the winding 26 of the motor, lead 27, coil L1, to the other side of the power supply. It should be noted that resistor 24 is arranged in shunt to lead 27 only when the brushes are on a metallic segment 22. The resistor 24 is small enough in value to allow the synchronous motor to start when switch 30 is closed, should the motor at any previous time of running have stopped with the brushes on the insulating drum 21.

Due to the action of the brushes 23 switching resistor 24 in and out of the circuit, as the drum 21 revolves, transients are produced in leads 25 and 27 which appear at the parallel connected circuit elements L1 and C1. The values of the coil L1 and condenser C1 are such that their resonant frequency, say 2400 cycles per second, is very much higher than the 60 cycles per second power line frequency in order to prevent undesired operation of the trigger circuit coupled to L1, C1 by means of circuit L2, C2. The circuits L1, C1, L2, C2 are magnetically linked together and filter out the power frequency so that only the transients introduced by the drum arrangement appear at the electrodes of the trigger circuit.

It will thus be seen that the drum arrangement (which we can refer to as an antenna switch) supplies two switching transients which are ninety mechanical degrees apart, after which no transients are supplied for the remaining 270 mechanical degrees of the drum 21. The voltage at the terminal 1 of circuit L2, C2 is shown ideally as V1 in Fig. 2. Thus, the drum switch produces two pulses separated from each other by the repetition period (1/240 second) of the outgoing pulses from the transmitter, then no pulses are produced at the other two points (90° and 180° ahead, respectively, of the last pulse) when pulses are transmitted from the antenna A. These pulses (shown as in graph V1 of Fig. 2) are applied to the tube structure T1.

The tube structure T1 in the interests of tube economy is shown as a dual triode and comprises an evacuated envelope containing therein a pair of triode electrode structures each including an anode, a control grid and a cathode. Both anodes are supplied with positive polarizing potentials through resistors 29 and 31. The grid of the first or left hand triode is coupled to the anode of the second or right hand triode through a condenser C3, while the grid of the second triode is coupled to the anode of the first triode through a condenser-shunt resistor combination, as shown. A resistor R1 normally biases the grid of the first triode to permit anode current to flow, while a source of negative potential—C biases the grid of the second triode to anode current cut-off. Thus, normally, the first or left hand triode is conducting, while the second triode is non-conducting, and for this reason the tube T1 and associated elements may be referred to as a self-restoring or flip-flop trigger circuit. The normal condition of this trigger circuit is the stable state, while the triggered condition is the active state.

The application of a negative pulse (note V1 of Fig. 2) to the grid of the first triode, due to a transient in leads 25, 27, will so bias this grid as to cause the flow of anode current in this structure to cease, as a result of which the voltage will rise at the anode of the first triode. It should be noted that only the negative part of the transient will affect the trigger circuit in the form described. The sudden increase in potential on the anode of the first triode will cause a positive pulse to be applied through the condenser-shunt resistor combination to the grid of the second triode structure. This positive pulse will trigger the circuit to cause the second triode to become conducting and the first triode to cease conducting. When the second triode starts conducting, there will be an IR drop in resistor 31 as a result of which a negative pulse will be applied to condenser C3 and the grid of the first triode. The time constants of condenser C3 and R1 determine how long the first triode will remain non-conducting and the second triode conducting. When the negative charge on condenser C3 leaks off through resistor R1, the trigger circuit will be restored to normal, in which condition the first triode will be conducting and the second triode non-conducting.

As a result of the operation of trigger circuit T1, positive pulses will appear on the left hand anode of the tube T1 and be impressed through condenser C4 and resistor R2 onto the first grid of tube T2. These positive pulses are indicated by graph V2 of Fig. 2, and have a time duration of less than one-quarter period but greater than one-eighth period, by suitable choice of elements R1, C3 and the anode resistors and the operating voltages of trigger circuit T1.

Tube T2 is biased through resistor R2 by negative source—C, to be normally non-conducting. The positive pulses from trigger T1 are of such magnitude that they overcome the negative bias on tube T2 and cause current to flow through this tube. Tube T2 is a screen grid structure, and has its screen grid coupled via condenser C5 and lead 10 to the transmitter to receive negative synchronizing pulses each time the transmitter fires, which occurs 240 times per second, corresponding to once for each quadrant or lobe position of antenna A. The negative synchronizing pulses applied to the screen electrode of tube T2 are represented by graph V3 in Fig. 2.

The positive pulses (V2 of Fig. 2) from the trigger T1 start conduction in tube T2, while the negative pulses (V3 of Fig. 2) from the transmitter cause the tube T2 to cease conducting. The results of these two groups of pulses (V2 and V3) is shown in graph V4 of Fig. 2 which represents the output from tube T2. This output comprises positive pulses which recur at the same rate and period as the pulses shown in graph V1.

The positive pulses from T2 are impressed through condenser C6 on the right hand grid of tube structure T3. T3 is a self-restoring or flip-flop type of vacuum tube trigger circuit whose electrodes are interconnected in the same manner as T1. The left hand triode electrode structure of T3 is normally conducting while the right hand electrode structure is non-conductive in the stable state of the trigger circuit, and these current passing conditions are reversed in the active state of the trigger circuit. The positive pulses from T2 serve to trigger or trip tube T3, as a result of which output pulses of negative polarity are obtainable from trigger circuit T3 and applied to condenser C7. These negative output pulses from T3 are represented by graph V5 of Fig. 2 and have a trailing edge which is adjustable in time depending upon the time constants of the trigger circuit T3. The double arrow on the trailing edges of the pulses of V5 represents the adjustability of these pulses. This adjustment may be made by varying resistor R5.

Condenser C7 and resistor R6 form a differentiator circuit from producing sharp impulses from the starting and trailing edges of the output pulses from T3. The results of the differentiation action by C7, R6 are shown in graph V6 of Fig. 2. The sharp impulses of graph V6 are applied to the anode of diode rectifier T4 which passes only the positive impulses. The rectification action of T4 results in an output shown in graph V7 of Fig. 2.

The output pulses V7 from the rectifier T4 are impressed on a three stage clipper amplifier 11 in which the pulses are narrowed in requisite manner and amplified without sensible time lag. In practice, the clipper amplifier 11 would be a three stage resistance-capacitance type.

The output from the clipper amplifier 11 is a series of pulses shown by graph V8 of Fig. 2, and these pulses are impressed on the saw-tooth generator W. The pulses from 11 are impressed on the saw-tooth voltage produced by generator W at some desired point in its sweep so as to accelerate the sweep at that point for the duration of the clipped pulse from 11. This point on the sweep is selected to correspond to the position of an echo pulse during the up and right lobe positions of the antenna. During the down and left lobe positions of the antenna, the echo pulses appear normally on the normal sweep (unaccelerated). The acceleration produced by the output pulses from the clipper amplifier 11 during the up and right lobes displace the echo pulses received in these lobe positions relative to the echo pulses received during the down and left lobe positions. Because of the ability of the operator to adjust the position of the accelerator pulse (V8 of Fig. 2), it is possible to select any desired one echo pulse from a group of echoes representing several targets appearing on the oscilloscope screen. It should be understood that in the operation of the present invention it makes no difference which one of the up or down lobe position reflected pulses or which one of the right and left lobe position pulses is held stationary and which one is displaced, and for this reason, if desired, a modified sweep circuit can be employed.

It should be understood that the invention is not limited to an antenna drum switch arrangement having two conducting segments, since the objects of the invention are obtainable with such an antenna switch having only one conducting segment, in which case the constants of the trigger circuit T1 (determinable in part by the values of R1 and C3) must be such that the output pulse from this trigger lasts longer than the repetition period (1/240 second) but less than twice the period (1/120 second). In such a case, the output pulse V2 from the trigger T1 would consist of one long pulse lasting longer than two pulses V3 of Fig. 2 but less than three such pulses. The operation of the rest of the system would be the same as described above. Such simplification has been avoided in the showing of Fig. 1 because the repetition rate is small (period large) and trigger circuits tend to become unstable if the product of R1 and C3 is made too large. If the repetition rate were larger, such a system can be used with the resultant simplification of mechanical details.

What is claimed is:

1. A conical scanning antenna system sequentially assuming different overlapping lobe patterns, a cathode ray tube system, a sweep circuit in the form of a saw-tooth generator for said cathode ray tube, and means including an electron discharge device trigger circuit whose output is coupled to said sweep circuit for supplying thereto at predetermined times an acceleration pulse to modify the normal sweep path of the voltage wave produced by said saw-tooth generator and thus differentiate between certain lobe positions of said antenna.

2. A directive antenna system comprising a parabolic reflector and a radiating element positioned off-center in front of said reflector, a motor driving said element in a circle about the axis of said reflector, a pair of cathode ray tubes one for indicating the vertical positions of said radiating element, and the other for indicating the horizontal positions of said radiating element, a sweep circuit for said cathode ray tubes, and means including a trigger circuit in the form of a pair of interconnected electron discharge device electrode structures coupled to said sweep circuit for supplying thereto a sweep modifying pulse at some point during the sweep travel in only one vertical position and in only one horizontal position of said radiating element for producing indications on the cathode ray tubes which are characteristic of these positions of said radiating element.

3. An obstacle detection system comprising a transmitter for periodically sending short wave carrier pulses of short duration spaced in time an amount which is large compared to the time of each pulse, a directive antenna system for said transmitter including a parabolic reflector having a radiating element positioned off-center, a two-pole synchronous motor for rotating said radiating element in a circular path, whereby said antenna system periodically assumes a plurality of beam positions, an electronic tube indicating system, a saw-tooth voltage generator whose output is coupled to said indicating system, and electronic means coupled to said rotating radiating element for superimposing on the output of said saw-tooth generator an accelerating pulse during only such times when said radiating element is in certain positions.

4. An obstacle detection system comprising a transmitter for periodically sending short wave carrier pulses of short duration spaced in time an amount which is large compared to the time of each pulse, a directive antenna system for said transmitter including a parabolic reflector having a radiating element positioned off-center, a two-pole synchronous motor for rotating said radiating element in a circular path, whereby said antenna system periodically assumes a plurality of beam positions, an electronic tube indicating system, a saw-tooth voltage generator whose output is coupled to said indicating system, and electronic means coupled to said rotating radiating element for superimposing on the output of said saw-tooth generator an accelerating pulse during only such times when said radiating element is in certain positions, said electronic means having adjustable circuit elements for adjusting the position of said accelerating pulse relative to any point on the output wave of said generator.

5. A directive antenna having a synchronous driving motor for causing said antenna to sequentially assume different positions of effectiveness, a transmitting system for applying pulses to said antenna to be radiated thereby during said different positions, a cathode ray tube, a sweep circuit for said cathode ray tube, and an electronic pulse producing system having an input circuit responsive to the motion of said driving motor solely during two positions thereof spaced 90° apart for producing only two impulses for each cycle of operation of the antenna and an output circuit coupled to said sweep circuit, whereby said cathode ray tube indicates by characteristic markings the different beam firing positions of said antenna.

6. A directive antenna having a two-pole synchronous driving motor for causing said antenna to assume sequentially four different beam firing positions corresponding to the four quadrants of a circle, first and second cathode ray tubes, a sweep circuit in the form of a triangular wave generator for said cathode ray tubes, an electronic trigger circuit effectively operative solely during two adjacent quadrants of the circular path traveled by said antenna for producing a pulse for each of said two quadrants, and a coupling circuit between the output of said trigger circuit and said sweep circuit, said coupling circuit including another trigger circuit of adjustable constants for producing adjustable length pulses, a differentiator, and a rectifier for rectifying only those differentiated pulses which correspond to the trailing edges of said adjustable length pulses, whereby said coupling circuit supplies to said sweep circuit short pulses which can be adjusted over any desired point on the trace of the triangular wave produced by said sweep circuit.

7. A directive antenna adapted to assume different beam firing positions, means for optically distinguishing between certain ones of said beam firing positions comprising a cathode ray tube, a sweep circuit in the form of a saw-tooth generator for said cathode ray tube, and a circuit for supplying a short impulse to said sweep circuit for modifying the saw-tooth wave output therefrom at any desired position in the trace thereof, including a trigger circuit responsive to certain positions of said antenna for producing a pulse during each of said positions, a differentiator in the output of said trigger circuit, and a rectifier for passing only those differentiated impulses corresponding to the trailing edges of the trigger output pulses, the output of said rectifier being coupled to said sweep circuit.

WILLIAM A. MILLER.

REFERENCES CITED

The following references are of record in the file of this patent:

UNITED STATES PATENTS

| Number | Name | Date |
|---|---|---|
| 2,082,347 | Leib et al. | June 1, 1937 |
| 2,103,090 | Plebanski | Dec. 21, 1937 |
| 2,231,929 | Lyman | Feb. 18, 1941 |
| 2,237,661 | Ernst | Apr. 8, 1941 |
| 2,405,930 | Goldberg et al. | Aug. 13, 1946 |